United States Patent [19]

Harris et al.

[11] Patent Number: 5,160,536
[45] Date of Patent: Nov. 3, 1992

[54] PRINTING INK FOR GOLF BALLS

[75] Inventors: Kevin M. Harris, New Bedford; Thomas L. Mydlack, Fairhaven, both of Mass.

[73] Assignee: Acushnet Company, New Bedford, Mass.

[21] Appl. No.: 687,396

[22] Filed: Apr. 18, 1991

[51] Int. Cl.$^5$ .............................................. C09D 11/14
[52] U.S. Cl. .................................................. 106/19 R
[58] Field of Search ....................... 106/26, 23, 30, 22, 106/19, 20, 26; 101/398; 273/235 R, 235 A

[56] References Cited

U.S. PATENT DOCUMENTS

| | | | |
|---|---|---|---|
| 1,596,545 | 8/1926 | Lawrence | 106/26 |
| 3,264,272 | 8/1966 | Rees | 260/78.5 |
| 3,454,280 | 7/1969 | Harrison et al. | 273/235 |
| 3,819,768 | 6/1974 | Molitor | 260/897 B |
| 3,961,965 | 6/1975 | Zwahlen | 106/26 |
| 4,204,879 | 5/1980 | Paskins et al. | 106/311 |
| 4,205,991 | 6/1980 | Becker et al. | 106/22 |
| 4,442,282 | 4/1984 | Kolycheck | 528/83 |
| 4,462,832 | 7/1984 | Jeftmar et al. | 106/23 |
| 4,623,392 | 11/1986 | Ou-Yang | 106/30 |
| 4,679,794 | 7/1987 | Yamada et al. | 273/235 R |
| 4,679,795 | 7/1987 | Melvin et al. | 273/235 R |
| 4,798,386 | 1/1989 | Berard | 273/235 R |
| 4,865,326 | 9/1989 | Isaac | 273/235 A |

FOREIGN PATENT DOCUMENTS

| | | |
|---|---|---|
| 54-65638 | 5/1979 | Japan . |
| 55-123473 | 9/1980 | Japan . |
| 56-82849 | 7/1981 | Japan . |
| 60-109647 | 8/1985 | Japan . |
| 61-168855 | 10/1986 | Japan . |
| 210597 | 6/1987 | New Zealand . |
| 835719 | 5/1960 | United Kingdom . |
| 862645 | 3/1961 | United Kingdom . |
| 1014651 | 12/1965 | United Kingdom . |
| 1243479 | 8/1971 | United Kingdom . |

OTHER PUBLICATIONS

Kirk-Othmer, Encyclopedia of Chemical Technology, vol. 13, Third Ed., pp. 374–397.

Primary Examiner—Karl Group
Assistant Examiner—Helene Klemanski
Attorney, Agent, or Firm—Pennie & Edmonds

[57] ABSTRACT

The ink formulation contains a coloring matter, pigment, and a carrier containing nitrocellulose, solvent and a plasticizer. The ink formulation contains 1–40% by weight pigment; above 10% by weight nitrocellulose. 40–80% by weight solvent, and 1–25% by weight plasticizer. This ink formulation avoids the step of precoating the ball prior to printing where the ball has a cover made from an ionomer resin (SURLYN ®).

14 Claims, No Drawings

PRINTING INK FOR GOLF BALLS

This invention relates to golf balls and, more particularly, to an ink which will transfer directly to the surface of a golf ball having a cover made from an ionomeric resin without the need for a primer coat.

Conventionally, golf balls are made by molding a cover about a core and impressing dimples or brambles onto the surface of the cover. The core is either wound or solid. A wound core is made by winding elastic thread about a center that is either a solid rubber sphere or a liquid-filled spherically shaped envelope. A solid core is generally a homogeneous spherical mass, but can comprise a plurality of solid pieces.

The cover is molded about the core either in a compression molding operation or an injection molding operation. Compression molding uses two preformed half-shells which are positioned about a core in a mold wherein heat and pressure are applied to the preformed half-shells. The heat and pressure cause the half-shells to flow about and mold around the core. Injection molding forces a fluid cover stock material about the core. Typically, a retractable pin mold is used wherein the retractable pins are withdrawn after the cover stock starts to harden.

Covers are made predominately from an ionomeric resin known as SURLYN ® which is a thermoplastic resin sold by E.I. duPont de Nemours & Co. of Wilmington, Del., see U.S. Pat. Nos. 3,264,272 and 3,454,280. Ionomeric resins are copolymers of an olefin having from two to five carbon atoms with a metal salt of an unsaturated carboxylic acid containing from three to eight carbon atoms. Conventionally, such ionomeric resins are a copolymer of ethylene and a salt of acrylic or methacrylic acid. The cation is, typically, a metal ion of zinc, lithium or sodium. Golf ball covers are also made from mixtures of ionomers, see U.S. Pat. No. 3,819,768 issued Jun. 25, 1974.

Golf balls are conventionally stamped or printed with a trademark and other identifying indicia. One problem associated with printing on golf balls having covers made from ionomeric resin is that conventional printing inks do not transfer well to the cover unless a primer coat is first applied. Thus, in order to obtain good ink transfer, ionomeric resin covered golf balls are first coated with some sort of paint, either opaque or clear, and then a second clear layer is typically applied to the cover to protect the printing and improve the cosmetic appearance of the ball.

Another problem associated with conventional golf ball inks is the unintended transfer of ink from one golf ball to another. After transfer of the ink to the ball and before a second clear coat is applied on top of the ink, ink will often transfer from one ball to another upon contact. This unintended transfer of ink requires golf balls which have been printed to be kept separate from each other during material handling operations. The separation of the balls after printing and before the second clear coat can be applied and dried is necessary to avoid transfer.

Applicants have now discovered an ink that transfers directly to unpainted ionomeric resin covered golf balls and adheres well to the ionomeric golf ball cover such that the ink on the printed ball does not transfer to another ball even when the balls come into contact. Besides eliminating the transfer problems and handling problems associated with conventional golf ball inks, this also allows the manufacturer to apply only one clear coat to the surface of a golf ball to protect the ink, thereby obviating the need for applying a primer coat. However, in order to have the most aesthetically pleasing ball, both a primer clear coat and a top clear coat are applied to the ball after the printing step. This two coat system also gives added protection to the imprint and, if the primer coat has a solvent which does not affect the imprint, gives very sharp definition to the imprint.

The ink composition of the present invention comprises a coloring matter and a carrier for the coloring matter, said carrier containing as an essential ingredient therein nitrocellulose. The coloring matter is a pigment or a dye while the carrier comprises nitrocellulose, a solvent and a plasticizer.

Preferably, the ink composition of the present invention comprises a coloring matter in an amount of about 1% to about 40% by weight based on the total weight of the ink; and a carrier in an amount of about 99% to 60% by weight based on the total weight of the ink. More preferably, the amount of coloring matter is about 5% to about 30% by weight while good results have been obtained using about 10% to about 20% by weight of coloring matter. The amount of carrier used is such that the total weight of the ink formulation adds up to 100%.

The carrier comprises a solvent, plasticizers and as an essential ingredient therein nitrocellulose. In fact, the ink of the present invention is characterized as having a high nitrocellulose content. Preferably, the nitrocellulose content is above about 10% by weight based on total weight of the ink formulation. More preferably, the nitrocellulose content of the ink is between about 10% and about 30% by weight based on the total weight of the ink composition. Good results have been obtained with an ink having a nitrocellulose content of about 20% by weight of the total weight of ink.

The amount of solvent used in the present invention is preferably about 40% to about 80% by weight based on the total weight of the ink formulation. More preferred the solvent makes up about 45% to about 75% by weight of the ink formulation. Good results have been obtained with about 55% by weight of solvent.

The amount of plasticizer is preferably about 1% to about 25% by weight of the total ink formulation and more preferably about 5% to about 20% by weight. Good results have been obtained with about 10% by weight of the total weight of the ink formulation containing plasticizer.

Nitrocellulose ($C_6H_7O_2(ONO_2)_3$), also referred to as cellulose nitrate, is widely used in printing inks, typically at about 7% by weight of the ink. Any conventional source of nitrocellulose can be used.

The solvent can be any conventional solvent that is compatible with nitrocellulose and which has an evaporation rate of 0.1 to 1.5 based on ASTM D 3539-87 with n-butyl acetate as the standard. Good solvents include glycol ethers such as methoxy propanol, methoxy propyl acetate and ester-ethers such as ethyl-3-ethoxypropionate (EEP). Combinations of these elements have been found to work well in the present invention.

Preferably, a pigment is used as the coloring matter. The pigment is preferably red or black; however, other colors, such as green and orange, can be used. A good black pigment for the present invention is carbon black. A good red pigment for the present invention is a monoazo salt.

Conventional plasticizers are used, such as dispersions of polyethylenes, hydrocarbons and vegetable and animal waxes.

More preferably, the ink of the present invention comprises about 40% by weight of a methoxy propanol or an ethyl-3-ethoxypropionate; about 5% by weight methoxy propyl acetate; about 10% by weight isopropanol; about 20% by weight nitrocellulose; about 15% by weight pigment; and about 10% by weight plasticizer.

The ink of the present invention should have a density of between about 8 to about 10 pounds/gallon (1.0 to 1.2 kg/liter) and more preferably about 8.5 to about 9.75 pounds/gallon (1.02 to 1.17 kg/liter).

It has been found that at ambient conditions the ink will dry on the surface of the golf ball in about 10 to about 30 seconds depending on the solvent solution. A heat source such as a hot air blower (at about 50° C.) can be used to shorten the drying time of the ink to about 5 to 10 seconds. The ink must be dried first to avoid ball to ball transfer problems.

Printing of the trademark and other indicia on the golf ball is done using conventional pad printing techniques.

The surface of the golf ball is preferably prepared to promote ink and paint adhesion, e.g. by sand blasting, tumbling in an abrasive media, and washing. All foreign material, non-ionomer resin cover stock material, is preferably removed from the surface of the ball. Any conventional method can be employed to remove foreign matter. Typically, the methods employed to prepare the surface of the ball to promote ink and paint adhesion also removes foreign matter.

In one specific example, a golf ball having a cover of Surlyn ionomer resin with 50% Surlyn 7930, 10% Surlyn 8660 and 40% Surlyn 8920 was prepared for pad printing by using conventional sand blasting techniques. The ball was washed, dried and then introduced to the pad printer, a Model TS 125 available from Trans Tech America of Schaumberg, Ill. The pad print ink, made according to the present invention, had approximately the following composition:

| Component | % by Weight |
|---|---|
| Nitrocellulose | 13 |
| Carbon black | 18 |
| Ethyl-3-ethoxypropionate | 57 |
| Plasticizer | 8.5 |

After application the ink was dried at about 140° F. for about 5–7 seconds. The ink did not transfer to another ball when it was brought into direct contact with the other ball.

A series of two dozen golf balls were tested against non-cellulose based printing inks all of which were applied to the cover of the golf ball made from an ionomeric cover stock. The inks were applied using a pad printing technique and no coating was put on top of the printed balls. The balls with the nitrocellulose based ink in accordance with the present invention had superior durability to the non-nitrocellulose based inks.

It will be understood that the claims are intended to cover all changes and modifications of the preferred embodiments of the invention herein chosen for the purpose of illustration which do not constitute a departure from the spirit and scope of the invention.

What is claimed is:

1. A golf ball printing ink comprising a pigment or a dye as a coloring matter, and a carrier for the coloring matter, said carrier comprising a solvent and a plasticizer and containing as an essential ingredient therein nitrocellulose.

2. The golf ball printing ink of claim 1 wherein said nitrocellulose is present in an amount of above about 10% by weight based on the total weight of said ink.

3. The golf ball printing ink of claim 1 wherein said nitrocellulose is present in an amount of about 10% to about 30% by weight based on the total weight of said ink.

4. The golf ball printing ink of claim 1 wherein said coloring matter is present in an amount between about 1% to about 40% by weight based on the total weight of said ink.

5. The golf ball printing ink of claim 1 wherein the solvent is present in the carrier in an amount between about 40% to 80% by weight based on the total weight of said ink, said solvent being compatible with nitrocellulose and has an evaporation rate of 0.1 to 1.5 based on ASTM D 3539-87 with n-butyl acetate as the standard; the plasticizer is present in the carrier in an amount between about 1% to about 25% by weight based on the total weight of the ink, and said plasticizer being selected from dispersions of polyethylenes, hydrocarbons and vegetable and animal waxes.

6. The golf ball printing ink of claim 1 wherein said coloring matter is present in an amount of about 5 to about 30% by weight based on the total weight of ink; and said nitrocellulose is present in an amount of about 10% to about 30% by weight based on the total weight of the ink.

7. The golf ball printing ink of claim 1 wherein the solvent is present in the carrier in an amount between about 45% to 75% by weight based on the total weight of said ink, said solvent being compatible with nitrocellulose and has an evaporation rate of 0.1 to 1.5 based on ASTM D 3539-87 with n-butyl acetate as the standard; the plasticizer is present in the carrier in an amount between about 5% to about 20% by weight based on the total weight of the ink, and said plasticizer being selected from dispersions of polyethylenes, hydrocarbons and vegetable and animal waxes.

8. A golf ball printing ink comprising;
   (a) above about 10% by weight nitrocellulose based on the total weight of the ink;
   (b) about 40–80% by weight solvent based on the total weight of the ink, said solvent being compatible with nitrocellulose and having an evaporation rate of 0.1 to 1.5 based on ASTM D 3539-87 with n-butyl acetate as the standard;
   (c) about 1–40% by weight pigment based on the total weight of the ink; and
   (d) about 1–25% by weight plasticizer based on the total weight of the ink, said plasticizer being selected from dispersions of polyethylenes, hydrocarbons and vegetable and animal waxes.

9. The golf ball printing ink of claim 8 wherein the pigment is selected from the group consisting of a black pigment and a red pigment.

10. The golf ball printing ink of claim 8 wherein the solvent comprises methoxy propanol, methoxy propyl acetate and isopropanol.

11. The golf ball printing ink of claim 8 wherein the solvent comprises ethyl-3-ethoxypropionate methoxy propyl acetate and isopropanol.

12. A golf ball printing ink comprising:

(a) about 40% by weight ethyl-3-ethoxypropionate based on the total weight of the ink;
(b) about 5% by weight methoxy propyl acetate based on the total weight of the ink;
(c) about 10% by weight isopropanol based on the total weight of the ink;
(d) about 20% by weight nitrocellulose based on the total weight of the ink;
(e) about 15% by weight pigment based on the total weight of the ink; and
(f) about 10% by weight plasticizer based on the total weight of the ink, said plasticizer being selected from dispersions of polyethylenes, hydrocarbons and vegetable and animal waxes.

13. A method for printing on a golf ball comprising the steps of:
   (a) treating an unpainted golf ball cover made from ionomeric resin to remove substantially all foreign matter from the cover; and
   (b) printing indicia on the treated surface of the ionomeric resin golf ball cover with an ink comprising a pigment or a dye as a coloring matter and a carrier for the coloring matter, said carrier comprising a solvent and a plasticizer and containing as an essential ingredient therein nitrocellulose.

14. The method of claim 13 wherein the successive steps of sand blasting and washing are used to treat the surface of the golf ball.

* * * * *

UNITED STATES PATENT AND TRADEMARK OFFICE
CERTIFICATE OF CORRECTION

PATENT NO. : 5,160,536

DATED : November 3, 1992

INVENTOR(S) : Harris et al.

It is certified that error appears in the above-identified patent and that said Letters Patent is hereby corrected as shown below:

Title page, item [56] References Cited, "1975" should read --1976--.

Column 4, line 66: "ethyl-3-ethoxypropionate methoxy" should read --ethyl-3-ethoxypropionate, methoxy--.

Signed and Sealed this

Fourteenth Day of December, 1993

Attest:

BRUCE LEHMAN

Attesting Officer  Commissioner of Patents and Trademarks